United States Patent [19]

Studer

[11] Patent Number: 4,732,353
[45] Date of Patent: Mar. 22, 1988

[54] THREE AXIS ATTITUDE CONTROL SYSTEM

[75] Inventor: Philip A. Studer, Silver Spring, Md.

[73] Assignee: The United States of America as represented by the Administrator of the National Aeronautics and Space Administration, Washington, D.C.

[21] Appl. No.: 795,805

[22] Filed: Nov. 7, 1985

[51] Int. Cl.⁴ .............................................. B64G 1/28
[52] U.S. Cl. ................................................... 244/165
[58] Field of Search ................... 244/158 R, 164, 165, 244/166; 310/90.5; 364/459; 74/5.46

[56] References Cited

U.S. PATENT DOCUMENTS

| | | | |
|---|---|---|---|
| 3,439,884 | 4/1969 | Slater | 364/459 |
| 3,452,948 | 7/1969 | Kukel et al. | 244/165 |
| 3,694,041 | 9/1972 | Studer | 310/90.5 |
| 3,741,500 | 6/1973 | Liden | 244/165 |
| 3,813,067 | 5/1974 | Mork | 244/165 |
| 3,968,352 | 7/1976 | Andeer | 244/164 |
| 4,065,189 | 12/1977 | Sikorra | 244/166 |
| 4,211,452 | 7/1980 | Poubeau | 244/165 |
| 4,230,294 | 10/1980 | Pistiner | 244/165 |
| 4,285,552 | 8/1981 | Sutter | 310/90.5 |
| 4,294,420 | 10/1981 | Broquet | 244/165 |
| 4,316,394 | 2/1982 | Dohogne | 74/5.46 |
| 4,381,875 | 5/1983 | Studer | 310/90.5 |
| 4,387,935 | 6/1983 | Studer | 310/90.5 |
| 4,452,092 | 6/1984 | Donkort | 74/5.46 |
| 4,464,943 | 8/1984 | Andrews | 74/5.46 |
| 4,483,570 | 11/1984 | Inoue | 244/166 |
| 4,611,863 | 9/1986 | Isely | 310/90.5 |

Primary Examiner—Galen Barefoot
Attorney, Agent, or Firm—R. Dennis Marchant; John R. Manning; Ronald F. Sandler

[57] ABSTRACT

A three axis attitude control system for an orbiting body, such as a spacecraft, comprises a motor driven flywheel supported by a torque producing active magnetic bearing. Free rotation of the flywheel is provided about its central axis and together with limited angular torsional deflections of the flywheel about two orthogonal axes which are perpendicular to the central axis. The motor comprises an electronically commutated DC motor, while the magnetic bearing comprises a radially servoed permanent magnet biased magnetic bearing capable of producing cross-axis torques on the flywheel. Three body attitude sensors for pitch, yaw and roll generate respective command signals along three mutually orthogonal axes (x, y, z) which are coupled to circuit means for energizing a set of control coils for producing torques about two of the axes (x and y) and speed control of the flywheel about the third (z) axis. An energy recovery system, which is operative during motor deceleration, is also included which permits the use of a high speed motor to perform effectively as a reaction wheel suspended in the magnetic bearing.

20 Claims, 9 Drawing Figures

THREE AXIS ATTITUDE CONTROL SYSTEM

ORIGIN OF THE INVENTION

The invention described herein was made by an employee of the U.S. Government and may be manufactured and used by or for the Government for governmental purposes without the payment of any royalties thereon or therefor.

TECHNICAL FIELD

This invention relates generally to an attitude control system for a free body in space and more particularly to a three axis attitude control system for a body stabilized vehicle which may be, for example, a spacecraft orbiting the earth.

BACKGROUND ART

Attitude control systems for body stabilized vehicles such as spacecraft and satellites are well known. Typically, such systems are comprised of: (a) low speed reaction wheels, one for each axis; (b) two control moment gyros, each of which is capable of controlling two axes; or (c) momentum wheels capable of passive gyroscopic torques in two axes and active control in a third axis.

The prior art is known to be deficient in that none of the noted devices provide active control in all three of the axes and must be used in combination with one another. In the case of bias momentum wheels, only a limited performance is achievable. Power supplied to the attitude control system, moreover, is typically all dissipated or inefficiently recovered. Also, in the prior art systems, the lack of coincidence of control axes additionally poses an increase in control complexity and can introduce additional undesired local disturbances.

Accordingly, it is an object of the invention to provide an improvement in attitude control systems.

It is another object of the invention to provide an attitude control system which produces three symmetrical bidirectional controllable torques.

It is a further object of the invention to provide an attitude control system which produces three symmetrical bidirectional control torques and symmetrical angular momentum storage capabilities.

It is yet another object of the invention to provide an attitude control system providing three symmetrical bidirectional controllable torques and angular momentum storage in a single device.

STATEMENT OF THE INVENTION

The foregoing and other objects of the invention are provided in a three axis attitude control system including a motor driven flywheel supported by a torque producing active magnetic bearing, thus allowing free rotation of the flywheel about its central axis and limited angular torsional deflections of the flywheel about two orthogonal axes which are perpendicular to the central axis. The motor comprises an electronically commutated DC motor, while the magnetic bearing comprises a radially servoed permanent magnet biased magnetic bearing capable of producing cross-axis torques on the flywheel. Attitude control is provided by three body attitude sensors for pitch, yaw and roll which generate respective command signals along three mutually orthogonal axes (x, y, z) which are coupled to circuit means for energizing a set of control coils for producing torques about two of the axes (x and y) and speed control of the flywheel about the third (z) axis. An energy recovery system, which is operative during motor deceleration, is also included which permits the use of a high speed motor to perform effectively as a reaction wheel suspended in the magnetic bearing.

BRIEF DESCRIPTION OF THE DRAWINGS

The foregoing as well as other objects, features and advantages of the invention will become apparent from the following description taken in conjunction with the accompanying drawings wherein.

DETAILED DESCRIPTION OF THE INVENTION

Most orbiting vehicles, such as a spacecraft orbiting the earth, require active three axis control of attitude about a set of orthogonal reference axes which are arbitrarily defined as: a pitch axis which is perpendicular to the orbit plane, a yaw axis which intercepts the center of the body being orbited, and a roll axis which is nominally coincident with the vehicle velocity vector.

Figure 1:
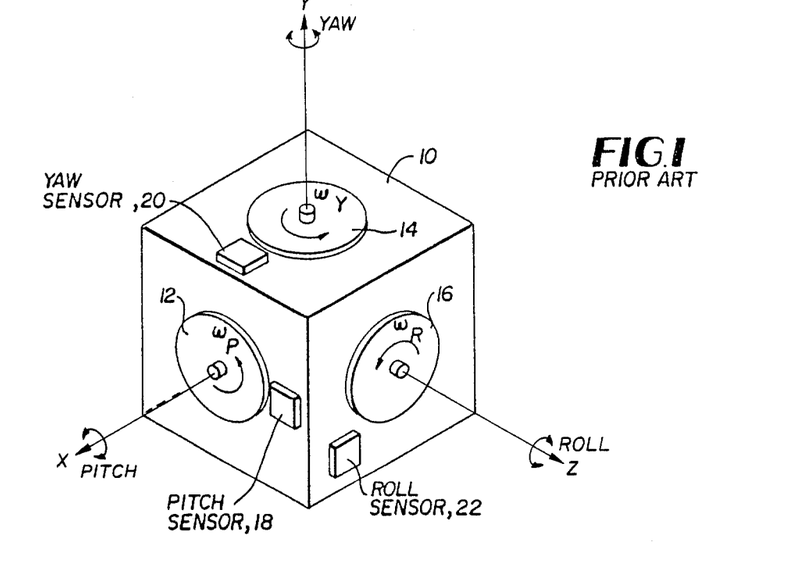
FIG. 1 is a diagram generally illustrative of a reaction wheel type of attitude control system.

The most common control actuators are inertia or reaction wheels. These are motor driven flywheels in which the motor torque accelerates and decelerates a flywheel in order to produce a reaction torque on the vehicle to control its attitude as shown in FIG. 1. Referring now to FIG. 1, reference numeral 10 denotes an attitude stabilized vehicle such as a spacecraft which includes three orthogonal motor driven flywheels 12, 14 and 16, whose rotational axes are located along the pitch (x), yaw (y) and roll (z) axes respectively. Each of the reaction wheels 12, 14 and 16 have angular velocities $\omega_p$, $\omega_y$ and $\omega_r$, the changes of which produce respective reaction torques and the sum of which operate to control attitude. Moreover, attitude sensors 18, 20 and 22, typically star trackers and gyros carried by the spacecraft, sense angular deviations of the spacecraft about the pitch, yaw and roll axes and produce error signals which are processed to command changes in rotational speed of the respective reaction wheels 12, 14 and 16.

Figure 2:
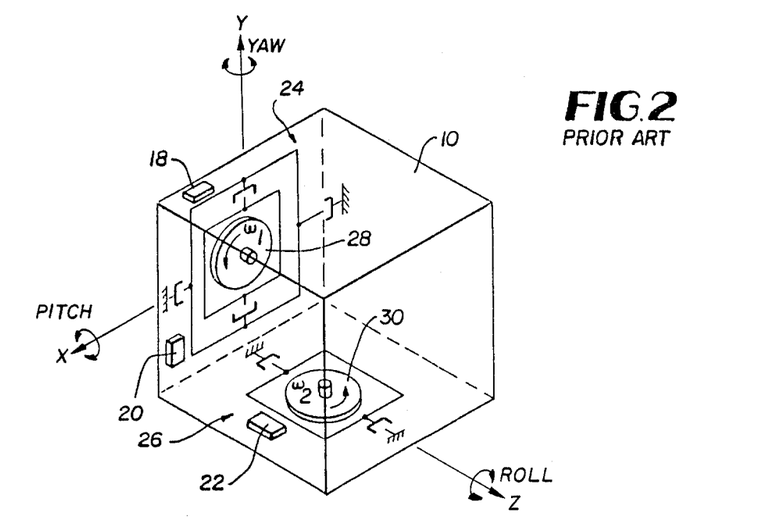
FIG. 2 is a diagram generally illustrative of a control moment gyro type of attitude control system.

Another known technique for attitude control of the vehicle 10 comprises the use of control moment gyroscopic devices. Such an arrangement is shown shematically in FIG. 2. Referring now to FIG. 2, the body 10 has its attitude controlled by a pair of gyroscopes 24 and 26. The gyroscope 24 furthermore comprises a double gimballed device including a flywheel 28. The flywheel 28 runs at a constant speed $\omega_1$ but whose axis of rotation can be varied by gimballed torques about two axes such as the pitch and yaw axes as shown. The gyroscope 26 includes a single gimballed wheel 30 which rotates at a constant speed of $\omega_2$ and whose axis of rotation can be varied by a gimballed torque about the roll axis. As in the reaction wheel type of attitude control shown in FIG. 1, attitude sensors including pitch, yaw and roll sensors 18, 20 and 22 are selectively positioned on the body 10 being controlled in attitude.

Figure 3:
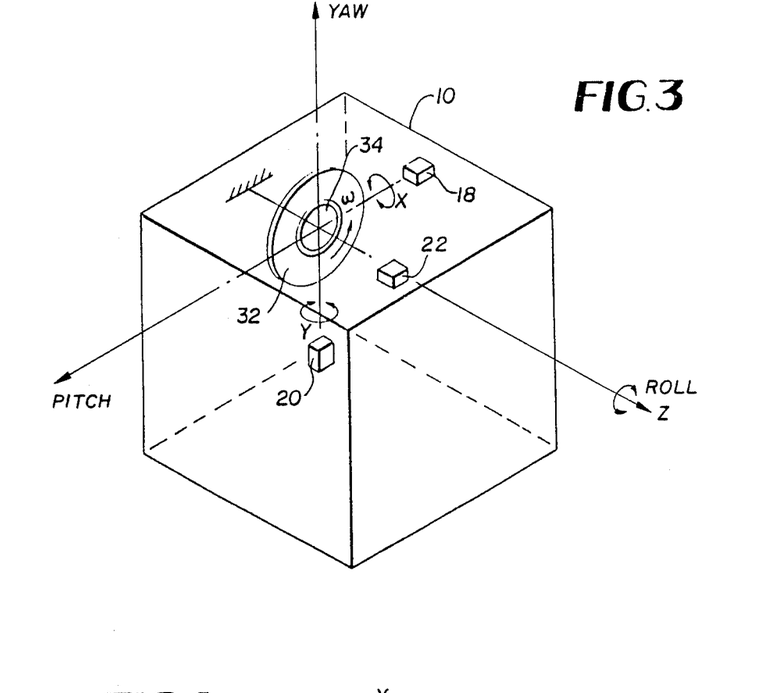
FIG. 3 is a diagram generally illustrative of a single flywheel three axis attitude control system in accordance with this invention.

The present invention, on the other hand, is directed to an attitude control system which is comprised of a single reaction wheel suspended by an active magnetic bearing which is capable of producing torques on the reaction wheel about a pair of orthogonal axes perpendicular to the normal axis of rotation. As shown in FIG. 3, a flywheel or bearing rotor 32 which comprises the rotor of a variable speed motor, not shown, rotates about the roll or z axis while being suspended by an interior magnetic bearing assembly 34. The magnetic bearing 34, as will be shown, includes magnetic circuit means for maintaining the rotor 32 radially stabilized along the pitch (x) and yaw (y) axes as well as producing torquing moments about the x and y axes in response to attitude error command signals produced by the pitch and yaw sensors 18 and 20. Variable and bi-directional angular velocity of the flywheel or rotor 32 is controlled by the roll sensor 22. The three sensors 18, 20 and 22 thus are responsive to motion of the vehicle 10 about the pitch, yaw and roll axes to generate signals for commanding a change in attitude of the vehicle.

Figure 4:
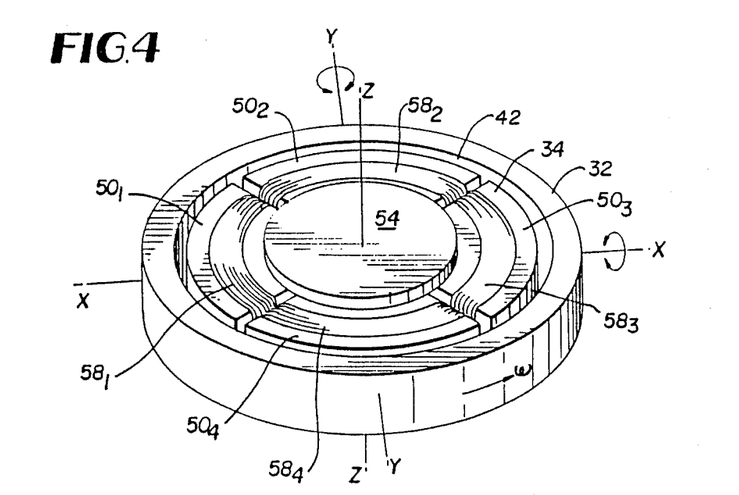
FIG. 4 is a perspective view illustrative of a motor driven flywheel supported on a magnetic bearing and which can be utilized as a three axis attitude control device in accordance with this invention.
Figure 5:
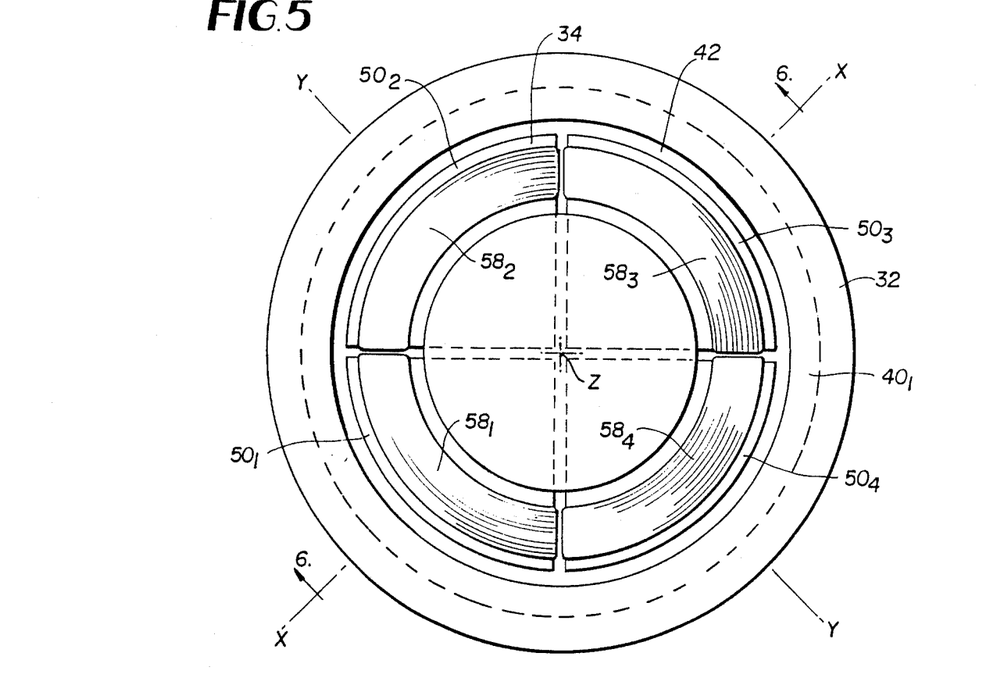
FIG. 5 is a plan view of the device shown in FIG. 4.
Figure 6:
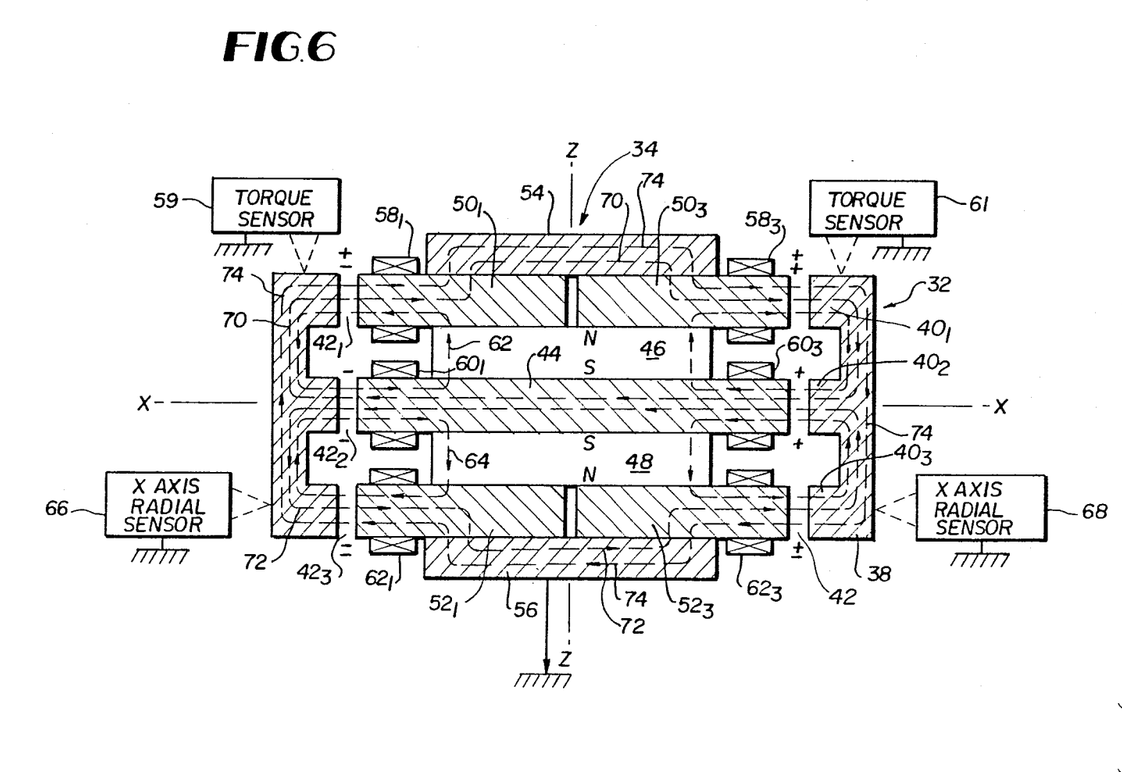
FIG. 6 is a cross sectional view of the device shown in FIG. 5 taken along the line 6—6 thereof.

The structural details of a three axis attitude control device in accordance with this invention are shown in FIGS. 4, 5 and 6. Considering these Figures, the flywheel, i.e. rotor 32 is shown centered about the x or roll axis and being separated from the bearing stator 34 by a circumferential air gap 42. As further shown in FIG. 6 which comprises a cross section of the device of FIGS. 4 and 5 taken along the x axis, the rotor 32 is shown comprised of a solid member 38 including inwardly facing rim portions $40_1$, $40_2$ and $40_3$ which terminate in circumferential pole faces which oppose similar pole faces provided by the bearing 34 across air gaps $42_1$, $42_2$ and $42_3$. One of the circumferential pole faces of the bearing stator 34 is provided by a magnetically permeable central disc member 44 having a pair of oppositely poled permanent magnet discs 46 and 48. As shown, the permanent magnet discs 46 and 48 have similar poles (S) mutually opposing one another.

On the outer faces of the two permanent magnet discs coincident with their opposite poles (N) are located two sets of four magnetically permeable elements $50_1$–$50_4$ and $52_1$–$52_4$ whose perimeters form the two other pole faces and which comprise quadrants of magnetically permeable discs having a similar diameter as the central disc 44 and whose vertices are directed toward the z axis as shown in FIG. 5. Moreover, the disc quadrants $50_1$–$50_4$ and $52_1$–$52_4$ are centered about their respective x and y axes. For example, diametrically opposed quadrants $50_1$ and $50_3$ are centered about the x axis while diametrically opposed quadrants $50_2$ and $50_4$ are centered about the y axis. In order to provide a flux path or bridge between the upper and lower sets of disc quadrants, there is provided an outer magnetically permeable disc member 54 over the disc segments $50_1$–$50_4$ and a like semi-permeable disc member 56 over the disc segments $52_1$–$52_4$. Further as shown, all of the bearing elements are coaxial with the z axis as best shown in FIG. 6.

Three sets of flux coils are shown in FIG. 6 provided on the bearing structure 34, with the first set comprising a set of four arcuate coils $58_1$–$58_4$ which are respectively located on each of the four upper disc quadrants $50_1$–$50_4$ shown in FIG. 5. The second set of four flux coils $60_1$–$60_4$ are located on the periphery of the center disc 44 and the third set of flux coils comprise four coils $62_1$–$62_4$ which are identical to and operate in conjunction with the upper set of coils $58_1$–$58_4$. Coils $62_1$–$62_4$ are located on quadrants $52_1$–$52_4$. The two opposing permanent magnet discs 46 and 48 generate constant or DC flux across the air gaps $42_1$ and $42_3$ and return via the central air gap $42_2$ as shown by the flux paths 62 and 64 to provide a passive magnetizing force for locating the rotor 32 axially along the z axis. The inner or second set of flux coils $60_1$–$60_4$, however, operate in response to the radial sensors arranged in the x and y axes to provide active radial centering of the rotor 32. For example, as shown in FIG. 6, x axis radial sensors 66 and 68 are diametrically located along the x axis adjacent the rotor 32 and operate to provide error signals for energizing the x axis flux coils $60_1$ and $60_3$ to provide a pair of circulating fluxes as shown by reference numerals 70 and 72. Identical y axis radial sensors, not shown, are provided along the y axis to energize diametrically opposing coils $60_1$–$60_4$.

Figure 7:
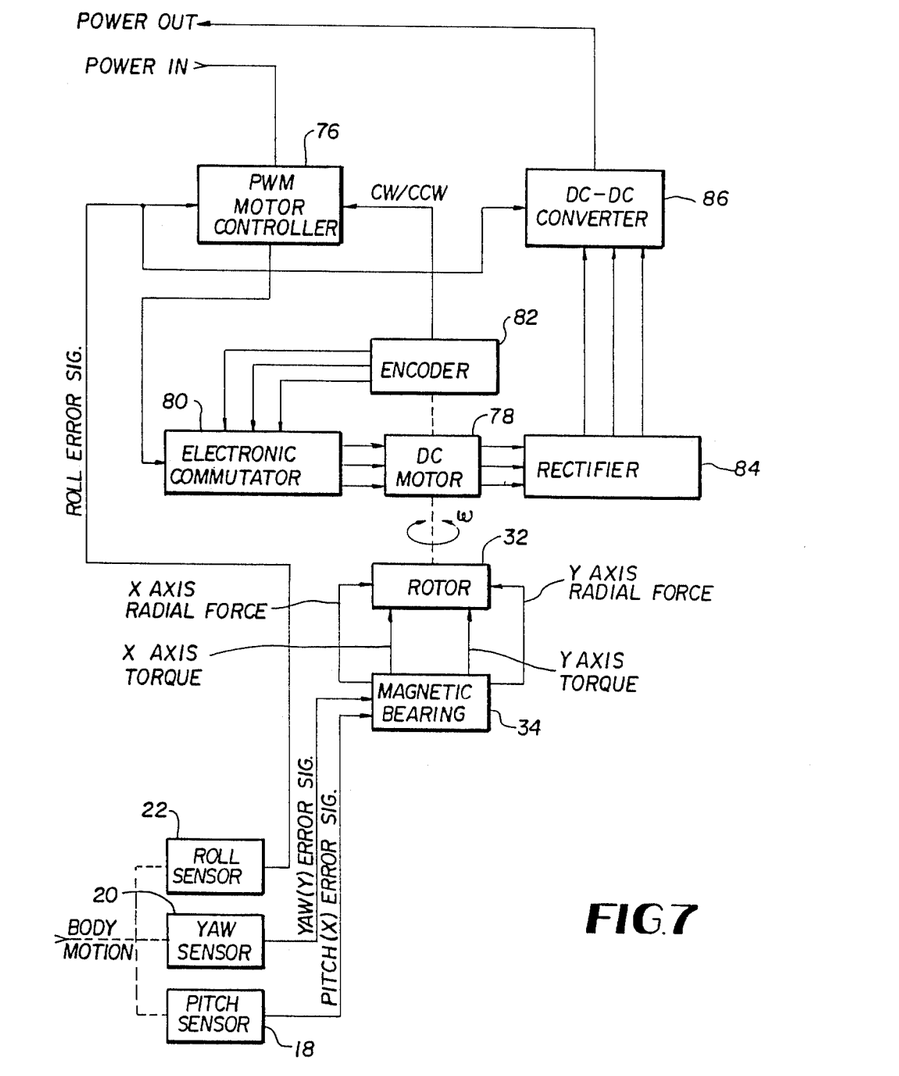
FIG. 7 is a general functional diagram of an attitude control system in accordance with a preferred embodiment of the invention.
Figure 9:
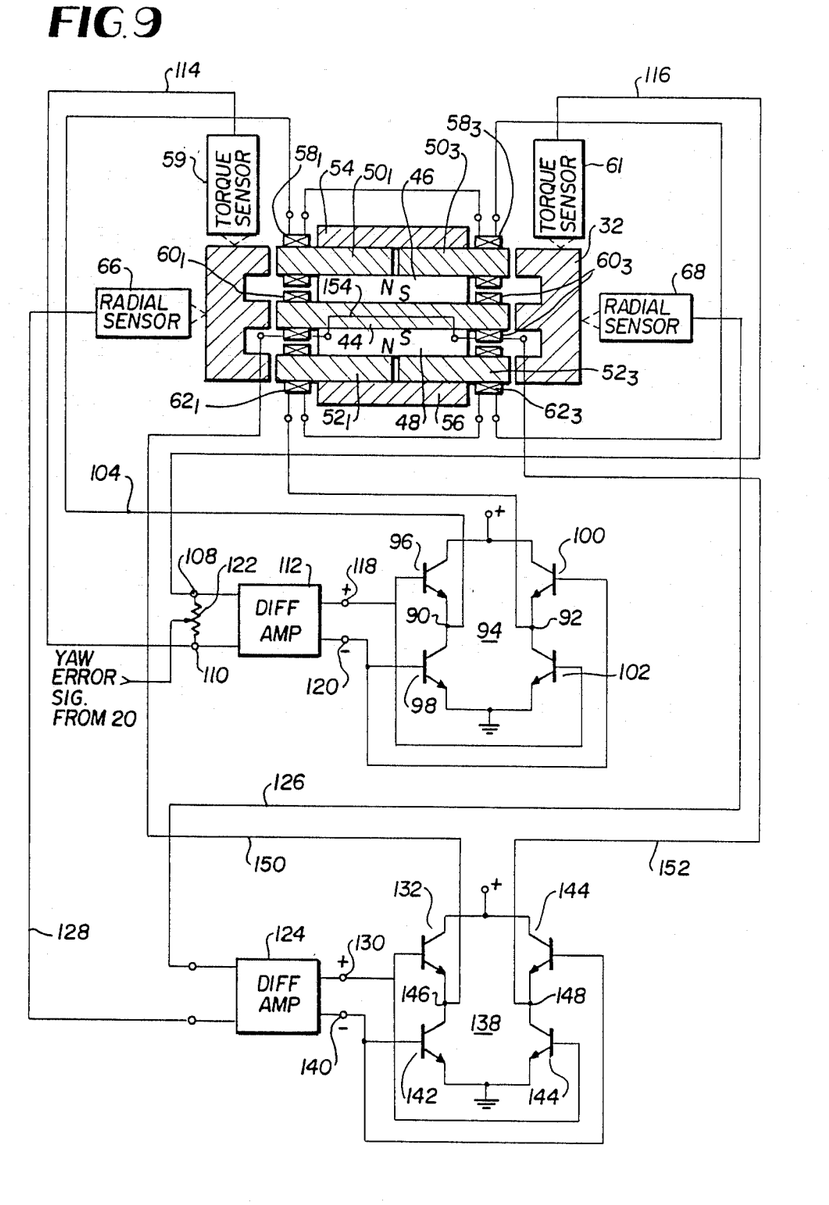
FIG. 9 is an electrical schematic diagram of a control circuit for controlling the radial forces and torquing moments in one of two planes in accordance with this invention.

The upper and lower i.e. first and third sets of flux coils $58_1$, $58_2$, $58_3$, $58_4$ and $62_1$, $62_2$, $62_3$ and $62_4$ are energized in response to yaw attitude error signals from the sensors 18 and 20 as shown in FIG. 7 to produce torque commands for generating fluxes which differentially control the flux across the air gaps $42_1$, $42_2$ and $42_3$ to generate a torque on the rotor 32 about either the x or y axes. Further as shown in FIG. 6, a pair of torque sensors 59 and 61 are arranged on either side of the z axis along the x axis and provide feedback signals in a control loop as shown in FIG. 9 and which will be referred to subsequently, to control the upper coils $58_1$ and $58_3$ in opposition to the lower coils $62_1$ and $62_3$, to produce a circulating flux as shown by reference numeral 74. The flux direction as shown in FIG. 6 provides a cumulative effect in the upper right hand corner and lower left hand corner while producing reduced magnetizing forces in the lower right and upper left hand corners to produce a counterclockwise torque about the y or yaw axis. An identical configuration would be provided for the pitch axis which causes the upper coils $58_2$ and $58_4$ to be energized in opposition to the lower coils $62_2$ and $62_4$ to produce a torque about the pitch or x axis. Thus it can be seen that the magnetic bearing 34 acts in response to pitch and yaw error signals provided by the pitch and yaw sensors 18 and 20 to provide x axis torques and y axis torques on the rotor 32 as well as providing x and y axis radial forces thereon.

Another aspect of this invention is an electronic motor drive for the rotor 32 as shown in FIG. 7 which includes an efficient energy recovery system for permitting a high speed motor to perform effectively as a reaction wheel while operating at speeds necessary to achieve relatively high gyroscopic torques within limited angular excursions. The flywheel 32 must operate in the order of 1000 radians per second. Positive error signals must be capable of producing proportional accelerating and negative error signals proportional decelerating torques about the spin axis (z axis) of the rotor, shown, for example, in FIG. 3. If the energy is not recovered by regenerative breaking, then practical considerations of power efficiency require the usual reaction wheel to be operated at relatively low speeds.

Accordingly, a pulsewidth modulation type of motor controller 76 controls a brushless DC motor 78 through an electronic commutator 80. As shown in FIG. 7, the DC motor 78 is mechanically coupled to the rotor 32 and controls its rotational speed $\omega$ in either direction while being suspended by the magnetic bearing 34 which is disclosed above, is operable to provide both active and passive x and y axis radial forces and additionally operable to actively generate x axis and y axis torques by differential flux control in response to yaw and pitch error signals received from the yaw sensor 20 and pitch sensor 18, respectively. The DC motor 78, moreover, is mechanically coupled to a digital encoder which provides multiphase commutation control signals to the commutator 80 and rotational direction information to the PWM motor controller 76. The motor 78, moreover, is coupled to a three phase rectifier 84 which in turn is coupled to a DC to DC converter 86. Whereas power from an external power source, not shown, is applied to the motor 78 through the motor controller 76 and the commutator 80. DC power is extracted from the motor during deceleration by means of the rectifier set 84 and returned back to the power source through the converter 86 which functions to match the variable generated voltage to the level of the power source.

Figure 8:
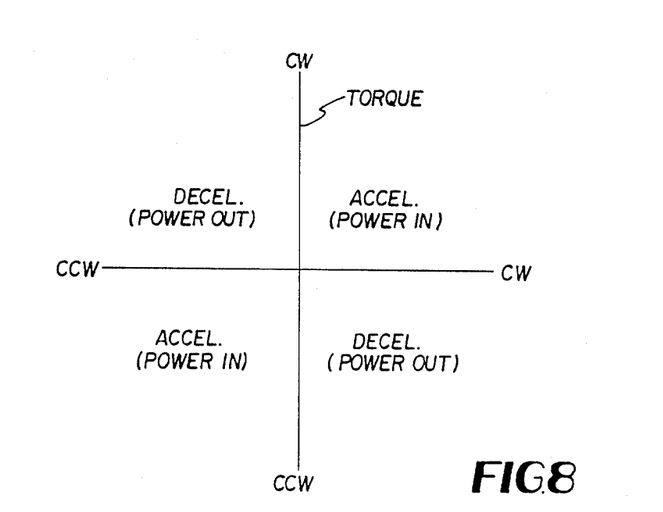
FIG. 8 is a diagram helpful in understanding this invention.

Furthermore, while the pitch and yaw sensors 18 and 20 for the x and y axes are utilized to generate x and y axis torques through the magnetic bearing 34, the third axis of attitude control, i.e. the roll or z axis, is obtained by directing an error signal from the roll sensor 22 to the motor controller 76 and the DC to DC converter 86, whereby the motor current and resultant torque is a function of the roll error signal. The polarity of the error signal determines the direction of the torque and the current flow. As shown in FIG. 8, for the clockwise rotation of the rotor 32, input power resulting in acceleration of the rotor will produce a clockwise torque, whereas a deceleration, resulting in power being fed back to the source, will result in a counterclockwise torque. Although bidirectional rotation of the motor 78 is shown in FIG. 7, it should be noted that when desired, it can operate unidirectionally in either the clockwise or counterclockwise direction since only $\Delta\omega$ is required for control.

Depending on past history of the disturbance, the rotor 32 may be operating at any particular speed and in either rotational direction. The direction of rotation information is obtained from the multiphase signal applied to the commutator 80 from the encoder 82. Since the rotor speed is determined by the previous history of external torques on the spacecraft 10, for example, and the rotor speed must be maintained with zero error signal, it is therefore essential that the drag be minimized to conserve power.

Referring now to FIG. 9, there is shown a feedback control circuit for producing torque moments about one axis, for example, the y axis with radial forces being actively produced along the x axis. As illustrated in FIG. 9, upper and lower pairs of torque producing flux coils $58_1$, $58_3$ and $62_1$, $62_3$ are connected in series across a pair of opposing terminals 90 and 92 of a transistor bridge 94 comprised of transistors 96, 98, 100 and 102.

The connection between coil $58_1$ to terminal 90 is made by means of circuit lead 104 while the connection from coil $62_1$ to terminal 92 is made by circuit lead 106.

Torque sensors 59 and 61 which may be, for example, rate sensors that provide signal proportional to torque, are positioned diametrically opposed to one another along the x axis adjacent the suspended rotor 32. The sensors 59 and 61 respond to any angular orientation of the rotor 32 about the y axis to generate electrical signals which are applied to the two inputs 108 and 110 of a differential amplifier 112 by means of circuit leads 114 and 116. The differential amplifier 112 includes a pair of output terminals 118 and 120 which produce positive and negative going signals, respectively, which are coupled to opposite transistors i.e. transistors 96, 102 and 98, 100 of the bridge 94, wherein controllable currents in either direction are fed to the coils $58_1$, $58_3$ and $62_1$, $62_3$. This will cause magnetic flux to circulate across the upper segments $50_1$, 54 and $50_3$ down through the rotor 32 across the lower plate segments $52_1$, 56 and $52_3$ returning via the opposite portion of the rotor 32. This flux interacting with the permanent magnet flux will generate torques on the rotor 32 about the y axis.

The permanent magnet flux operates not only to stabilize the rotor axially, i.e. along the z axis but also in conjunction with the controlled flux to enhance the differential force produced while reducing the ampere turn requirements thereby improving speed of response. A torque command signal for torquing the rotor 32 is comprised of the yaw error signal from the yaw sensor 20 and is applied to the differential amplifier, for example, by means of a potentiometer 122 coupled across the input terminals 108 and 110.

The torque sensors 59 and 61 operate in the absence of torque command signals to maintain position of the rotor 32 in equilibrium about the y axis; however, when a torque command signal is applied to the differential amplifier 112, a torquing moment will be generated, causing the rotor 32 to rotate about the y axis in one direction or the other depending upon the polarity of the torque command signal applied. An identical circuit configuration as shown in FIG. 9 would be utilized for producing torques about the x axis.

The coil windings for producing active radial control of the rotor 32 along either y axis or the x axis can, when desired, be integrated into the upper and lower sets of torque producing coils $58_1$, $58_3$ and $62_1$, $62_3$. However, in order to provide a relatively simplified explanation of means for producing radial forces along the x axis, for example, the radial sensors 66 and 68 are coupled into the inputs of a second differential amplifier 124 by circuit leads 126 and 128. The positive going output 130 of the differential amplifier is coupled to opposing transistors 132 and 136 of a second transistor bridge 138, while the negative going output 140 is coupled across opposing transistors 142 and 144. The bridge terminals 146 and 148 accordingly are coupled across the two inner flux producing windings $60_1$ and $60_3$ via circuit leads 150 and 152. The two windings $60_1$ and $60_3$ are internally connected by means of circuit lead 154. Control of the magnetic flux in the central gaps with return paths through the upper and lower gaps is thus provided and magnetic flux traversing these paths will produce the forces required to maintain the gaps equal.

Thus the magnetic bearing 34 providing differential control on the pitch (x) and yaw (y) axes producing controlled torquing moments on the rotor whose speed and direction of rotation about the roll (z) axis is controlled by control of the motor in response to a roll sensor while the x and y axis torques are controlled in response to pitch and yaw sensors, the attitude control of the body such as a spacecraft can be implemented with a single wheel. In contrast to the unlimited rotation about the spin axis, only a limited angular excursion perpendicular to the normal axis, i.e. z axis of the bearing, is practical for an internally gimballed wheel. However, the inertia of the wheel is supplemented by the gyroscopic effect which is proportional to the angular velocity and for a very high speed rotor, permitted by magnetic bearing, reasonable momentum storage capability can be obtained for relatively small angular displacements.

Having thus shown and described what is at present considered to be the preferred embodiment of the invention, it should be noted that the same has been made by way of illustration and not limitation. Accordingly, all modifications and alterations and changes coming within the spirit and scope of the invention are herein meant to be included.

I claim:

1. An attitude control system for a body stabilized vehicle such as a spacecraft, comprising:
   a motor driven flywheel centered about one of three mutually perpendicular axes and being coupled to a relatively high speed electrical motor whose rotary speed and acceleration is controlled to produce a bi-directional controllable torque about said one axis;
   motor control circuit means coupled between a power source and said motor and being operable to accelerate or decelerate said flywheel to produce a reaction torque about one of said axes;
   circuit means coupled to said motor for feeding power back to said power source during motor deceleration; and
   an active magnetic bearing, centered about said one axis, radially suspending said flywheel orthogonally along the other two of said three mutually perpendicular axes, said bearing further including electromagnetic circuit means for producing bi-directional controlled cross-axis torques of said flywheel about said two other axes, whereby a stabilized attitude of said vehicle in space is provided.

2. The attitude control system of claim 1 wherein said three mutually perpendicular axes of said vehicle include a roll axis, a pitch axis, and a yaw axis, and wherein said one axis comprises the roll axis, and the two other axes comprise the pitch and yaw axes, respectively.

3. The attitude control system of claim 1 and additionally including a plurality of vehicle attitude sensors carried by the vehicle for sensing deviations of said vehicle about said three mutually perpendicular axes and being operable to generate respective vehicle attitude command signals in response to a change in vehicle attitude about said three axes, and wherein said motor control circuit means is responsive to one of said attitude command signals for controlling motor speed and acceleration.

4. The attitude control system of claim 3 wherein said electromagnetic circuit means of said magnetic bearing are responsive to the other two of said attitude command signals for producing said cross-axis torques.

5. The attitude control system of claim 4 wherein said electromagnetic circuit means further comprises feedback control circuit means and additionally including feedback sensor means located adjacent said flywheel and being operable to sense any angular deviation of said flywheel from a commanded orientation relative to said two other axes and to generate error signals for both said two other axes, said error signals being applied to said control circuit means for reorienting said flywheel to said commanded orientation.

6. The attitude control system of claim 3 wherein said motor comprises an electronically commutated direct current motor.

7. The attitude control system of claim 6 wherein said motor control circuit means includes means coupled to said motor for providing a signal indicative of the direction of rotation of said motor, and a pulsewidth modulated motor controller coupled to said source and being responsive to said direction of rotation signal and said one attitude command signal to provide pulsewidth modulated power signals to an electronic commutator, said electronic commutator being coupled between said pulsewidth modulated motor controller and said direct current motor for driving said motor in a predetermined direction and rotational speed in response to said one attitude command signal and the pre-existing operating condition of said motor.

8. The attitude control system of claim 7 wherein said direction of rotation signal comprises a digital signal and said means for providing said direction of rotation signal comprises a multiphase digital encoder.

9. The attitude control system of claim 1 wherein said means for feeding power back to said power source further comprises rectifier means coupled to said motor whereby energy is extracted from said motor during deceleration, and power conversion means coupled between said rectifier means and said power source.

10. The attitude control system of claim 1 wherein said active magnetic bearing further includes a plurality of circumferential air gaps between said flywheel and said electromagnetic circuit means and additionally including permanent magnet means for providing passive stabilization of said flywheel axially along said one axis.

11. The attitude control system of claim 10 wherein said electromagnetic circuit means of said active magnetic bearing includes flux coil means for said two other axes and being selectively energized whereby magnetic flux provided by said flux coil means and said permanent magnet means reinforce and oppose each other along said two other axes on either side of said one axis to produce said controlled cross-axis torques.

12. The attitude control system of claim 10 wherein said electromagnetic circuit means of said active magnetic bearing includes flux coil means for said two other axes and being selectively energized whereby flux provided by said flux coil means and said permanent magnet means combine to provide active radial stabilization of said flywheel about said one axis along said two other axes.

13. The attitude control system of claim 1 and wherein said magnetic bearing comprises inner generally circular stator member having a plurality of peripheral outer surfaces defining a set of curvilinear interior pole faces, and wherein said flywheel comprises an outer annular magnetically permeable ring member having a like plurality of inwardly projecting rims including surfaces defining a set of curvilinear interior pole faces disposed opposite said set of exterior pole faces of the stator member and being separated therefrom by respective circumferential air gaps;

said stator member being further comprised of a central magnetically permeable member having a pair of opposing faces lying in a plane perpendicular to said one axis, a pair of magnetically opposed permanent magnets located on said pair of opposing faces and providing a substantially uniform radial DC flux across said circumferential air gaps for providing, per se, passive axial stabilization of said flywheel along said one axis, a first and second set of segmented magnetically permeable members respectively located on said pair of opposing faces and including flux bridge means for being magnetically coupled diametrically to direct flux across said air gaps along said two other axes, first flux coil winding means selectively located on said stator member and being selectively energized to produce flux which combines with said DC flux to produce differential radial forces across said circumferential air gaps to generate said cross-axis torques about said two other axes, and second flux coil winding means selectively located on said stator member and being selectively energized to produce flux which combines with said DC flux to provide active radial stabilization of said flywheel about said one axis.

14. The attitude control system of claim 13 wherein said first flux coil winding means are located on said first and second set of segmented magnetically permeable members.

15. The attitude control system of claim 13 wherein said second flux coil winding means are located on said central magnetically permeable member.

16. The attitude control system of claim 13 wherein said central magnetically permeable member comprises a generally flat circular plate having a peripheral outer surface defining one of said plurality of exterior pole faces and wherein said first and second set of segmented magnetically permeable members comprise quadrants of respective generally circular magnetically permeable discs and wherein the vertices of said quadrants intersect at said one axis.

17. The attitude control system of claim 13 and additionally including a plurality of vehicle attitude sensors carried by the vehicle for sensing deviations of said vehicle about said three mutually perpendicular axes and being operable to generate respective vehicle attitude command signals in response to a change in vehicle attitude about said three axes, and wherein said motor control circuit means is responsive to one of said attitude command signals for controlling motor speed and acceleration.

18. The attitude control system of claim 17 wherein said first flux coil winding means are responsive to the other two of said attitude command signals to produce said flux which combines with said DC flux to generate said cross-axis torques.

19. The attitude control system of claim 13 wherein electromagnetic circuit means further comprises feedback control circuit means and additionally including first feedback sensor means located adjacent said flywheel and being operable to sense any angular deviation of said flywheel from a commanded orientation about said two other axes and generate angular error signals for both said two other axes, and second feedback sensor means located adjacent said flywheel and being operable to sense any radial displacement of said flywheel from said one axis along said two other axes and generate radial error signals for both said two other axes, and wherein said angular error signals are applied to said first flux coil winding means and said radial error signals are applied to second flux coil winding means.

20. The attitude control system of claim 19 wherein said vehicle includes three mutually perpendicular axes defined as the roll, pitch and yaw axes and wherein said one axis comprises the roll axis, and said other two axes comprise the pitch and yaw axes.

* * * * *